US012420951B2

(12) United States Patent
Neuman et al.

(10) Patent No.: US 12,420,951 B2
(45) Date of Patent: Sep. 23, 2025

(54) CALIBRATION OF AIRCRAFT MOUNTED CAMERAS

(71) Applicant: Toyota Motor Engineering & Manufacturing North America, Inc., Plano, TX (US)

(72) Inventors: Tom M. Neuman, Fairfax, VA (US); Matthew M. Warren, Silver Spring, MD (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 82 days.

(21) Appl. No.: 17/957,016

(22) Filed: Sep. 30, 2022

(65) Prior Publication Data

US 2024/0109671 A1   Apr. 4, 2024

(51) Int. Cl.
*B64D 47/08* (2006.01)
*B64D 47/02* (2006.01)
(Continued)

(52) U.S. Cl.
CPC .............. *B64D 47/08* (2013.01); *B64D 47/02* (2013.01); *G03B 15/006* (2013.01); *G06T 7/70* (2017.01);
(Continued)

(58) Field of Classification Search
CPC ...... B64D 47/08; B64D 47/02; G03B 15/006; G06T 7/70; G06T 7/85;
(Continued)

(56) References Cited

U.S. PATENT DOCUMENTS 8,675,068 B2 * 3/2014 Nixon ................... B64U 20/87
348/147
9,472,109 B2 * 10/2016 Starr .................... G08G 5/0017
(Continued)

FOREIGN PATENT DOCUMENTS

AU    2017241363 A1    11/2018
DE    102016106707 B4    11/2019

OTHER PUBLICATIONS

Dolph et al., "Sense and Avoid for Small Unmanned Aircraft Systems", AIAA SciTech, Jan. 9-13, 2017, Grapevine Texas (12 pages).
(Continued)

*Primary Examiner* — Susan E. Hodges
(74) *Attorney, Agent, or Firm* — Christopher G. Darrow; Darrow Mustafa PC (57) ABSTRACT

An aircraft can include an aircraft body. The aircraft can include a wing, which can include a first wing tip and a second wing tip. The first wing tip and the second wing tip can be located on wing on opposite sides of the aircraft body. A camera can be located on the wing. The camera can have a field of view. The field of view including a portion of the flight environment and a portion of the aircraft body. The fields of view can be less than 180 degrees. The aircraft can include a calibration target. The calibration target can be located in the field of view. In some arrangements, the camera can be part of a stereoscopic camera system.

23 Claims, 6 Drawing Sheets

(51) Int. Cl.
*G03B 15/00* (2021.01)
*G06T 7/70* (2017.01)
*G06T 7/80* (2017.01)
*H04N 13/239* (2018.01)
*H04N 17/00* (2006.01)

(52) U.S. Cl.
CPC .............. *G06T 7/85* (2017.01); *H04N 13/239* (2018.05); *H04N 17/002* (2013.01); *G06T 2207/10012* (2013.01); *G06T 2207/30261* (2013.01)

(58) Field of Classification Search
CPC . G06T 2207/10012; G06T 2207/30261; G06T 2207/10032; G06T 2207/30204; H04N 13/239; H04N 17/002; H04N 13/246
USPC .......................................................... 348/47
See application file for complete search history.

(56) References Cited

U.S. PATENT DOCUMENTS

| | | | |
|---|---|---|---|
| 10,235,577 B1 | 3/2019 | Avadhanam et al. | |
| 10,475,209 B2 | 11/2019 | Shen et al. | |
| 10,958,843 B2* | 3/2021 | Xiong | H04N 23/69 |
| 10,992,921 B1* | 4/2021 | Cui | H04N 23/54 |
| 11,094,208 B2 | 8/2021 | Ray et al. | |
| 2003/0038933 A1* | 2/2003 | Shirley | G01B 21/042 356/243.1 |
| 2017/0200380 A1 | 7/2017 | Barnes et al. | |
| 2017/0359515 A1* | 12/2017 | Harris | H04N 23/90 |
| 2018/0002017 A1* | 1/2018 | Abeles | B64C 39/024 |
| 2019/0283488 A1* | 9/2019 | Samaca Martinez | B32B 27/286 |
| 2019/0291884 A1* | 9/2019 | Mackin | B64D 47/08 |
| 2021/0214103 A1* | 7/2021 | Casado Merino | B64F 1/002 |
| 2021/0392317 A1* | 12/2021 | Armatorio | G05D 1/106 |
| 2023/0154013 A1* | 5/2023 | Zink | G06T 3/18 |

OTHER PUBLICATIONS

Gauci et al., "Correspondence and Clustering Methods for Image-Based Wing-Tip Collision Avoidance Techniques", 28th International Congress of the Aeronautical Sciences, 2012 (13 pages).
Gauci, "Obstacle Detection in Aerodrome Areas Through the Use of Computer Vision", PhD Thesis, Apr. 2010 (279 pages).
Iris Automation, "Casia Safer Flight With Collision Avoidance", retrieved from the Internet: <https://www.irisonboard.com/casia/>, retrieved Sep. 29, 2022 (20 pages).
Sara, "Airborne DAA Solutions (PANCAS)", retrieved from the Internet: <https://sara.com/threat/air-based-DAA-solutions>, retrieved Sep. 29, 2022 (3 pages).
Stereolabs, "ZED 2i Built for Spatial AI.", retrieved from the Internet: <https://www.stereolabs.com/zed-2i/>, retrieved Sep. 29, 2022 (12 pages).
Echodyne, "UAV Radar", retrieved from the Internet: <https://www.echodyne.com/autonomy/uav-radar/>, retrieved Sep. 29, 2022 (3 pages).

* cited by examiner

CALIBRATION OF AIRCRAFT MOUNTED CAMERAS

FIELD

The subject matter described herein relates in general to aviation and, more particularly, to the use of cameras by aircraft for object detection.

BACKGROUND

When in flight, aircraft must avoid other aircraft and obstacles in the flight environment. There are various existing ways for detecting such objects. For instance, a monocular camera system can be used to detect obstacles. Obstacle detection can also be performed using electronically steered array (ESA) RADAR. Still further, passive acoustic triangulation of noise sources (e.g., airplane propellers and engines) can be used to locate some aircraft in a flight environment.

SUMMARY

In one respect, the present disclosure is directed to an aircraft. The aircraft can include an aircraft body. The aircraft can include a wing including a first wing tip and a second wing tip. The first wing tip and the second wing tip can be located on wing on opposite sides of the aircraft body. A camera can be located on the wing. The camera can have a field of view. The field of view can include a portion of the flight environment and a portion of the aircraft body. The field of view being less than 180 degrees. The aircraft can include a calibration target. The calibration target can be located in the field of view.

In another respect, the present disclosure is directed to a method of calibrating a camera mounted on a wing of an aircraft. The method can include acquiring, using the camera, visual data of a portion of the flight environment and a portion of a body of the aircraft that includes a calibration target. The method can further include analyzing the visual data to determine an offset of the camera relative to the calibration target.

In still another respect, the present disclosure is directed to a system for an aircraft with a stereoscopic camera system. The system includes an aircraft body. The system includes a first camera and a second camera located on opposite sides of the aircraft body. The system includes a first calibration target. The first calibration target can be located on or defined by the aircraft body. The first calibration target can be located in a field of view of the first camera. The system can include a second calibration target. The second calibration target can be located on or defined by the aircraft body. The second calibration target can be located in a field of view of the second camera. The system can include one or more processors that are operatively connected to receive visual data acquired by the first camera and the second camera. The one or more processors can be configured to analyze the visual data acquired by the first camera to determine a first offset of the second camera relative to the first calibration target. The one or more processors can be configured to analyze the visual data acquired by the second camera to determine a second offset of the second camera relative to the second calibration target. The visual data acquired by the first camera and the second camera can be acquired at substantially the same time. The one or more processors can be configured to adjust, using the determined first offset, the visual data acquired by the first camera. The one or more processors can be configured to adjust, using the determined second offset, the visual data acquired by the second camera. The one or more processors can be configured to analyze the adjusted visual data acquired by the first camera and the second camera to stereoscopically detect for one or more objects in a flight environment of the aircraft.

DETAILED DESCRIPTION

One challenge of aircraft-mounted cameras is that certain portions of the aircraft, such as the wings, are flexible. This flexibility can lead to translational and/or rotational motion of the wings, in addition to vibration. If cameras are mounted on opposite lateral sides of the wings (e.g., left and right cameras) are used for stereoscopic purposes, this motion may decrease the ability or accuracy of image correlation between the cameras.

A common way to compensate for the motion is to use an Inertial Measurement Unit (IMU) on the wingtips and body. The IMUs can determine the rotation of the cameras with relatively good precision. However, determining the translation is more difficult since it requires continuous integration of accelerometer data, known as an Inertial Navigation System (INS). This process can be error prone because it integrates sensor noise.

Accordingly, arrangements described herein are directed to a different approach for calibrating aircraft-mounted cameras and/or object detection. A camera can be located on a wing of the aircraft. The camera can have a field of view. The field of view can include a portion of the flight environment and a portion of the aircraft body. The field of view being less than 180 degrees. The aircraft can include a calibration target. The calibration target can be located in the field of view. The camera can acquire visual data of a portion of the flight environment and a portion of a body of the aircraft that includes a calibration target. The visual data can be analyzed to determine an offset of the camera relative to the calibration target due to movement of the camera. By understanding this offset, the effect of the in-flight movement of the wings on the cameras can be accounted for and the visual data can be adjusted accordingly. Ultimately, the adjusted visual data can be used to detect an object in the flight environment.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Figure 1:
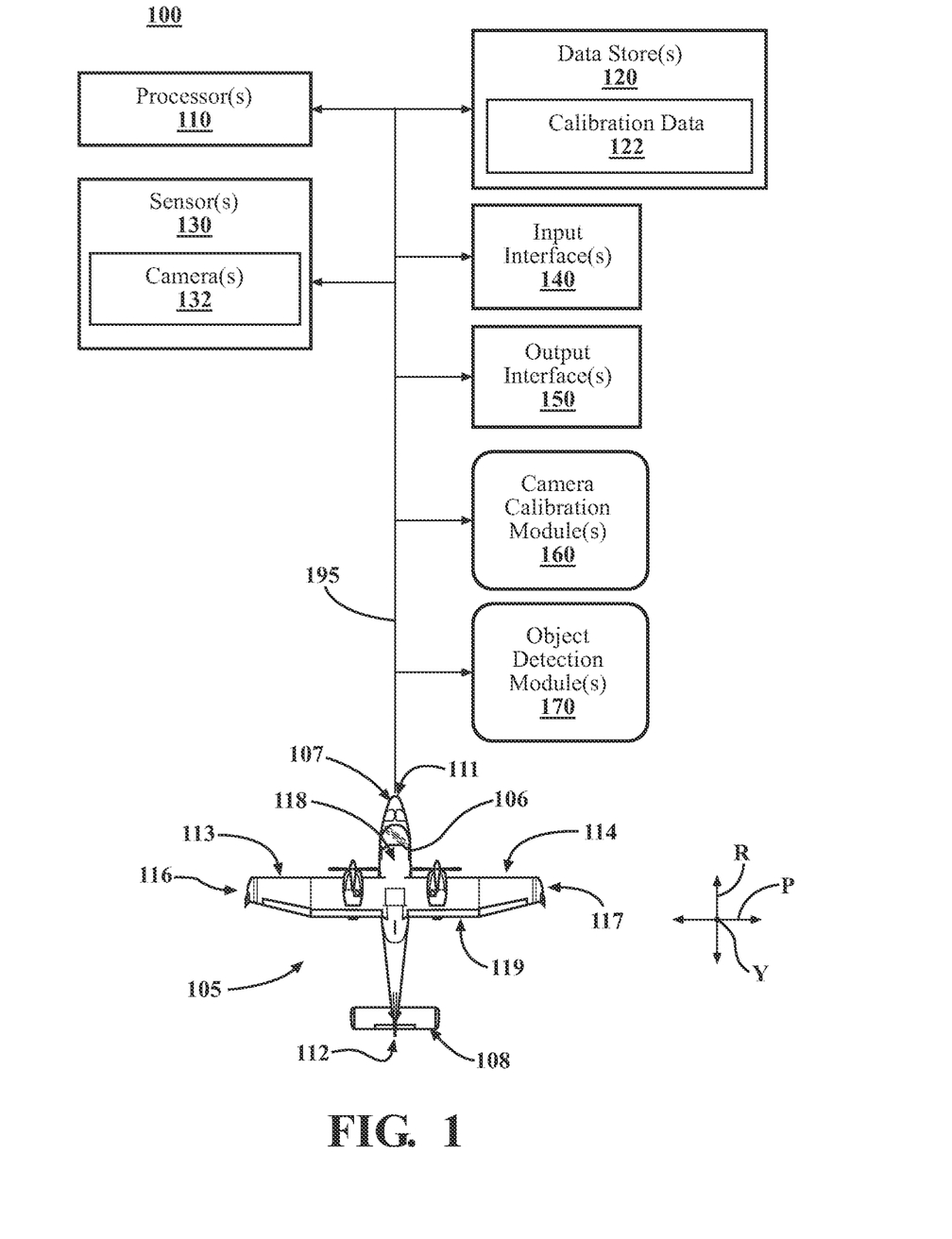
FIG. 1 is an example of a system for calibrating aircraft-mounted cameras and/or object detection using stereoscopic camera.

FIG. 1 is an example of a system 100 for calibrating aircraft-mounted cameras and/or object detection. Some of the possible elements of the system 100 are shown in FIG. 1 and will now be described. It will be understood that it is not necessary for the system 100 to have all of the elements shown in FIG. 1 or described herein. The system 100 can include one or more processors 110, one or more data stores 120, one or more sensors 130, one or more input interfaces 140, one or more output interfaces 150, one or more camera calibration modules 160, and/or one or more object detection modules 170.

In one or more arrangements, at least some of these various elements of the system 100 can be located onboard an aircraft 105. In one or more arrangements, all of the various elements of the system 100 can be located onboard the aircraft 105. Of course, it will be appreciated that one or more elements of the system 100 can be located remote from the aircraft 105.

As used herein, "aircraft" means any form of motorized or powered flight, now known or later developed. Non-limiting examples of aircraft include airplanes, drones, aerocars, and kites. A "drone" is a pilotless aircraft. In some arrangements, arrangements described herein can be used in connection with a fixed wing aircraft. In some arrangements, arrangements described herein can be used in connection with any aircraft that includes a fuselage and a wing.

While arrangements herein will be described in connection with aircraft, it will be appreciated that arrangements are not limited to use in connection with aircraft. Indeed, in some instances, arrangements described herein can be used in connection with land-based vehicles, water-based, and/or space-based vehicles. The aircraft 105 may be operated manually by a human pilot, semi-autonomously by a mix of manual inputs from a human pilot and autonomous inputs by one or more computers, fully autonomously by one or more computers, or any combination thereof. In some arrangements, the aircraft 105 can be unmanned. In some arrangements, the aircraft 105 can be remote-controlled by a remote operator (e.g., person or entity).

The aircraft 105 can include a body, which can include a fuselage 106. The fuselage 106 can have any size, shape, and/or configuration. The fuselage 106 can be made of any suitable material, including, for example, metal, plastic, fabric, wood, other materials, or any combination thereof. The aircraft can include a nose 107 and a tail 108. The aircraft 105 can have a front end 111 and a back end 112. The aircraft 105 can have an upper side 118 and a lower side 119. The terms "upper", "lower", "front", and "back" are used for convenience with respect to the relative position of the noted portion when the aircraft 105 is in its operational position.

The aircraft 105 can have a yaw axis Y, a pitch axis P, and a roll axis R. The yaw axis Y extends into and out of the page in FIG. 1. A nose 107 of the aircraft 105 can rotate right or left about the yaw axis Y. The pitch axis P extends in a left-right direction on the page in FIG. 1. The pitch axis P can generally extend transversely from wing to wing. The nose 107 of the aircraft 105 can rotate up and down about the pitch axis P. The roll axis R extends in a top-bottom direction on the page in FIG. 1. The roll axis R can generally extend from the front end 111 to the back end 112 of the aircraft 105. The aircraft 105 can rotate about the roll axis R. The aircraft 105 can rotate about one or more of these axes while in flight.

The aircraft 105 can include a first wing 113 and a second wing 114. The first wing 113 can extend substantially laterally from the fuselage 106 to a first wing tip 116. The second wing 114 can extend substantially laterally from the fuselage 106 to a second wing tip 117. While described herein as the first wing 113 and a second wing 114, it will be appreciated that the aircraft 105 can have or can be a single, continuous wing overall. In such case, the first wing 113 can be a first wing portion of a wing, and the second wing 114 can be a second wing portion of the same wing.

In some arrangements, the aircraft 105 can be a substantially symmetrical aircraft. In other arrangements, the aircraft 105 can be an asymmetrical aircraft. For instance, the first wing 113 (or first wing portion) and the second wing 114 (or second wing portion) can be different from each other in one or more respects, such as length, width, and/or height, just to name a few possibilities.

The system 100 can include one or more calibration targets. A "calibration target" can be any structure, device, apparatus, and/or element that can be used as a reference to calibrate one or more cameras of an aircraft. In some arrangements, the calibration target(s) can be a single calibration target. In other arrangements, there can be two or more calibration targets. In such instances, the calibration targets can be substantially identical to each other. Alternatively, one or more of the calibration targets can be different from the other calibration targets in one or more respects. In some arrangements, the calibration target(s) can be provided on one or more exterior surfaces of the aircraft 105. For instance, the calibration target(s) can be provided on a substantially fixed portion of the body of the aircraft 105. A "substantially fixed portion" is a portion of the aircraft that does not move or minimally moves during flight. Examples of the substantially fixed portion include the nose 107, the tail 108, and/or the fuselage 106 of the aircraft 105. The usage of the calibration target(s) will be described later.

Various examples of different types of calibration targets will be described herein. However, it will be understood that the embodiments are not limited to the particular calibration targets described.

Figure 3:
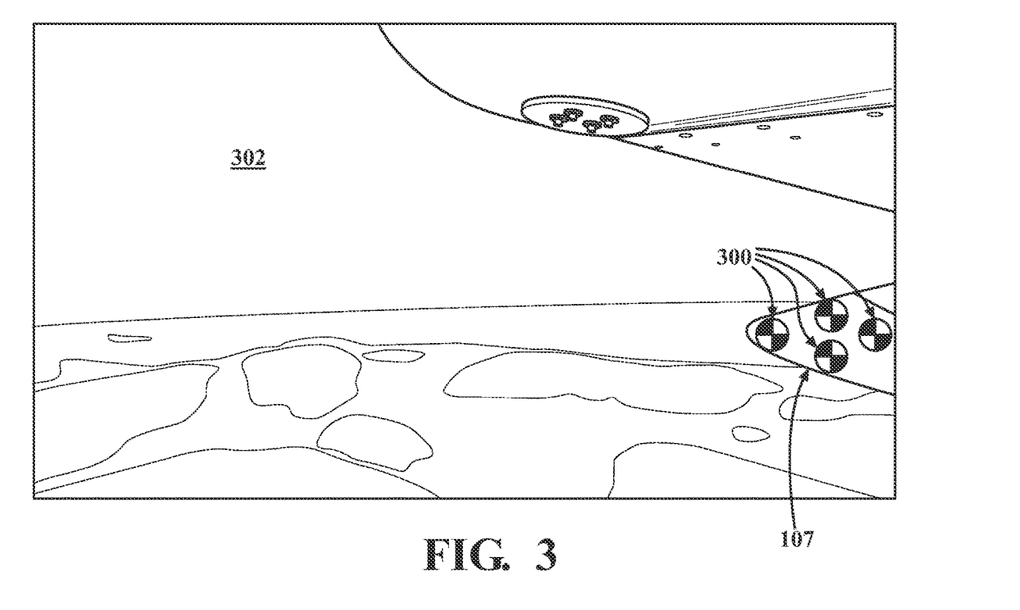
FIG. 3 is an example of a portion of an aircraft, showing a plurality of calibration dots located on a nose of the aircraft.

In some arrangements, the calibration target(s) can be one or more calibration dots 300. One example of calibration dot(s) 300 is shown in FIG. 3. The calibration dot(s) 300 can have any suitable size, shape, and/or configuration. The calibration dot(s) 300 can be provided on an exterior portion of the aircraft 105. For example, the calibration dot(s) 300 can be stickers or appliques attached to an exterior surface of the aircraft 105. As another example, the calibration dot(s) 300 can be painted or printed on an exterior surface of the aircraft 105. When there is a plurality of calibration dots 300, the plurality of calibration dots 300 can be arranged in any suitable manner on the aircraft 105. In some instances, the plurality of calibration dots 300 can be arranged in any suitable pattern. The calibration dot(s) 300 can be configured to be detectable by a computer vision system. More particularly, the calibration dot(s) 300, when appearing in visual data acquired by cameras, can be detected by a computer vision system.

Figure 5:
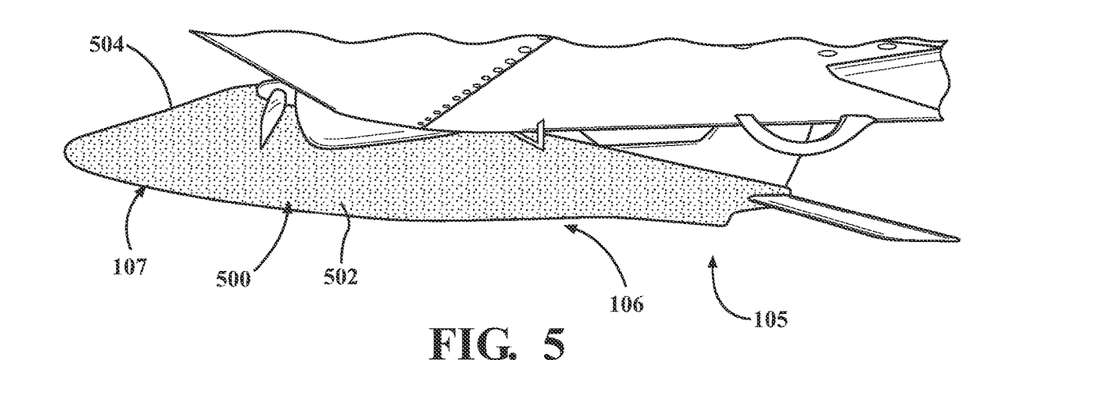
FIG. 5 is an example of a portion of an aircraft, showing a random speckle pattern of calibration targets on a body of the aircraft.

In some arrangements, the calibration target(s) can include a speckle pattern 500. In some arrangements, the speckle pattern 500 can be a random speckle pattern. One example of the random speckle pattern is shown in FIG. 5. The speckle pattern 500 can be provided on an exterior portion of the aircraft 105. For example, the speckle pattern 500 can be applied to an exterior surface of the aircraft 105, such as by painting, printing, or other suitable techniques. The speckle pattern 500 can comprise a plurality of individual targets 502. The individual targets 502 can be points, dots, etc. There can be any suitable quantity of individual targets 502 in the speckle pattern 500. For instance, there can be tens, hundreds, thousands, or millions of individual targets 502 in the speckle pattern 500. The individual targets 502 of the speckle pattern 500 can have any suitable size, shape, and/or configuration. In some arrangements, the individual targets 502 of the speckle pattern 500 can be substantially identical to each other in size, shape, and/or configuration. Alternatively, one or more of the individual targets 502 of the speckle pattern 500 can be different from the other individual targets 502 in one or more respects. The speckle pattern 500 can be configured to be detectable by a computer vision system. More particularly, the speckle pattern 500, when appearing in visual data acquired by cameras, can be detected by a computer vision system.

It should be noted that the calibration target(s) can be configured to be retroreflective and/or luminescent in any suitable manner, now known or later developed. Such attributes can be helpful in making the calibration target(s) clearly visible in all operation conditions (day, night, cloudy, stormy, in the shadow of a wing of the aircraft, etc.). Retroreflectivity or luminescence can be provided by the material of the calibration target(s), paint, coating, or in any other suitable manner, known known or later developed. In some arrangements, the aircraft 105 can include an illumination source (e.g., a near infrared illuminator, a light, etc.). The illumination source can be mounted on the aircraft 105 in any suitable locations so as to cause the portion of the aircraft 105 that includes the calibration target(s) to be illuminate. In some arrangements, the calibration target(s) can have a specific luminescence at a specific electromagnetic frequency of light. Alternatively, the calibration target(s) can be light illuminating, such that each calibration target emits light. In such case, there can be one or more lights associated with the calibration target(s). In some instances, the calibration target(s) can be lights.

In yet another example, the calibration target(s) can be defined by a profile 504 of a portion of the aircraft 105 itself. The profile 504 can be of a substantially fixed portion of the aircraft 105, such as a portion of the fuselage 106 and/or at least a portion of the nose 107. The profile can be detectable by a computer vision system. More particularly, the profile 504, when appearing in visual data acquired by cameras, can be detected by a computer vision system.

It will be understood that the above examples of the calibration target(s) are intended to be non-limiting. Further, it will be appreciated that the calibration target(s) can be any combination of the examples and/or other types of calibration target(s).

Each of the above noted elements of the system 100 will be described in turn below. The system 100 can include one or more processors 110. "Processor" means any component or group of components that are configured to execute any of the processes described herein or any form of instructions to carry out such processes or cause such processes to be performed. The processor(s) 110 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor(s) 110 can include at least one hardware circuit (e.g., an integrated circuit) configured to carry out instructions contained in program code. In arrangements in which there is a plurality of processors 110, such processors can work independently from each other or one or more processors can work in combination with each other.

The system 100 can include one or more data stores 120 for storing one or more types of data. The data store(s) 120 can include volatile and/or non-volatile memory. Examples of suitable data stores 120 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store(s) 120 can be a component of the processor(s) 110, or the data store(s) 120 can be operatively connected to the processor(s) 110 for use thereby. In some arrangements, the data store(s) 120 can be located remote from the aircraft 105. The term "operatively connected," as used throughout this description, can include direct or indirect connections, including connections without direct physical contact.

The data store(s) 120 can include calibration data 122. The calibration data 122 can include any information that can be used to calibrate one or more cameras carried by the aircraft 105. For instance, the calibration data 122 can include reference information about the calibration targets. As an example, the calibration data 122 can include reference position and/or distance information of calibration targets relative to one or more cameras 132 of the aircraft 105.

The system 100 can include one or more sensors 130. "Sensor" means any device, component and/or system that can detect, determine, assess, monitor, measure, quantify, acquire, and/or sense something. The one or more sensors can detect, determine, assess, monitor, measure, quantify, acquire, and/or sense in real-time. As used herein, the term "real-time" means a level of processing responsiveness that a user or system senses as sufficiently immediate for a particular process or determination to be made, or that enables the processor to keep up with some external process.

In arrangements in which the system 100 includes a plurality of sensors, the sensors can work independently from each other. Alternatively, two or more of the sensors can work in combination with each other. In such case, the two or more sensors can form a sensor network.

The sensor(s) 130 can include any suitable type of sensor. Various examples of different types of sensors will be described herein. However, it will be understood that the embodiments are not limited to the particular sensors described.

The sensor(s) 130 can include one or more cameras 132. The camera(s) 132 can be configured to capture visual data. "Visual data" includes video and/or image information/data. In some arrangements, the camera(s) 132 can be high resolution cameras. The camera(s) 132 can capture visual data in any suitable wavelength of the electromagnetic spectrum, including, for example, the visible, near infrared, infrared, or ultraviolet portions thereof. When there is a plurality of cameras 132, the cameras 132 can be part of a stereoscopic sensing system.

In some arrangements, the cameras 132 can be mounted on an exterior of the aircraft. Any suitable form of mounting, now known or later developed can be used. For example, the cameras 132 can be mounted on the exterior of the aircraft 105 by one or more fasteners, one or more welds, one or more brazes, one or more forms of mechanical engagement, one or more adhesives, one or more engaging structures, or any combination thereof.

The cameras 132 can be mounted on opposite portions of the aircraft 105. The cameras 132 can be positioned to be as far away from each other as practical, as the stereopsis can be improved by increasing the distance between the cameras 132. The cameras 132 can be mounted on a substantially fixed portion of the aircraft 105, that is, a portion of the aircraft 105 that exhibit little or no movement or vibration when in operation. In some arrangements, the cameras 132 can be mounted on the first wing 113 (or first wing portion) and the second wing 114 (or second wing portion) of the aircraft 105. In some arrangements, the cameras 132 can be mounted on the first wing 113 (or first wing portion) and the second wing 114 (or second wing portion), such as at or proximate the first wing tip 116 and/or the second wing tip 117. In this context, "proximate" means within about 15% of the length of the first wing 113 (or first wing portion) and the second wing 114 (or second wing portion) of the aircraft 105. In some arrangements, the cameras 132 can be located inboard of the first wing tip 116 and/or the second wing tip 117. The cameras 132 can be located on the first wing 113 (or first wing portion) and the second wing 114 (or second wing portion) at substantially the same distance from the fuselage 106 of the aircraft 105. In other arrangements, the cameras 132 can be located on the first wing 113 (or first wing portion) and the second wing 114 (or second wing portion) at different distances from the fuselage 106 of the aircraft 105.

Figure 2:
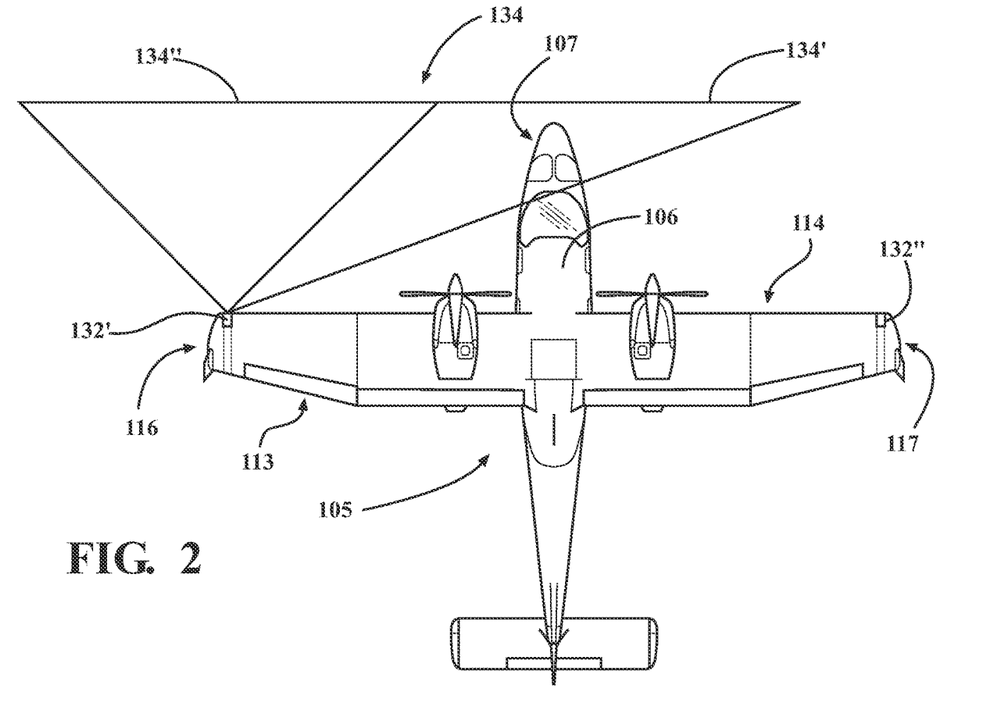
FIG. 2 is an example of a first configuration for calibrating aircraft-mounted cameras.

Each of the cameras 132 can have a field of view 134. At least some of the cameras 132 can be oriented so that their respective field of view 134 includes a portion of the body of the aircraft 105 that includes the calibration target(s). In some arrangements, the same cameras 132 can be oriented to also capture a portion of the flight environment of the aircraft, such as the forward or the rearward flight environment, in a single field of view. An example of such an arrangement is shown in FIG. 2. In this example, the field of view 134 includes a first portion 134' that includes a portion of the nose 107 of the aircraft 105 that includes the calibration dots 300. The field of view 134 also include a second portion 134" that includes a portion of the forward flight environment 302 of the aircraft 105.

Figure 4:
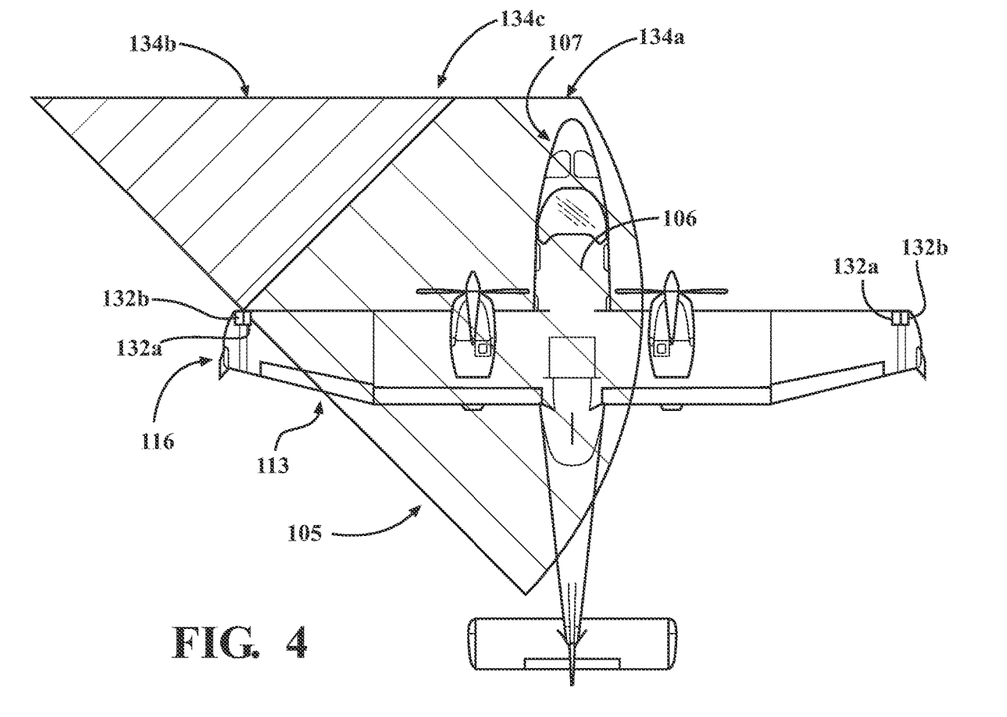
FIG. 4 is an example of a second configuration for calibrating aircraft-mounted cameras.

In some arrangements, there can be two (or more) cameras 132 mounted on the first wing 113 (or first wing portion) and/or the second wing 114 (or second wing portion). An example of such an arrangement is shown in FIG. 4. A first camera 132a of the of the two cameras 132 can be configured and/or oriented so that its respective field of view 134a captures visual data of a portion of the body of the aircraft 105 including the calibration target(s), and a second camera 132b of the two cameras 132 can be configured and/or oriented so that its respective field of view 134b captures visual data of a portion of the flight environment of the aircraft 105, such as the forward or the rearward flight environment. In such arrangements, there can be two separate fields of view 134a, 134b, which can be adjacent to each other, can slightly overlap each other, or can be slightly spaced from each other. The two separate fields of view 134a, 134b can define a collective field of view 134c.

The field of view 134 of the single camera 132 or the collective field of view 132c of the plurality of cameras 132a, 132b can span any coverage area. For instance, the field of view 134 or the collective field of view 134c can be less than 180 degrees, about 170 degrees or less, about 160 degrees or less, about 150 degrees or less, about 140 degrees or less, about 130 degrees or less, about 120 degrees or less, about 110 degrees or less, about 100 degrees or less, about 90 degrees or less, about 80 degrees or less, about 70 degrees or less, about 60 degrees or less, about 50 degrees or less, or about 40 degrees or less, just to name a few possibilities. However, it should be noted that the farther the cameras 132 are configured to look into the flight environment, the narrower the field of view 134 or the collective field of view 134c will be. Also, there may be a loss of efficiency and/or accuracy the farther that the cameras 132 look.

Some non-limiting examples of arrangements of the cameras 132 will now be described in greater detail. A first example of an arrangement is shown in FIGS. 2-3. In this example, a first camera 132' can be mounted on the first wing 113, such as at or near the first wing tip 116. Further, a second camera 132" can be mounted on the second wing 114, such as at or near the second wing tip 117. The cameras 132', 132" can be oriented to capture visual data of the flight environment in front of the aircraft 105. The cameras 132 can also be oriented to capture visual data of a substantially fixed portion of the aircraft 105 that includes the calibration target(s). This visual data can be used to determine the relative wingtip deflection and/or relative movement of the cameras 132 relative to the calibration target(s). In this example, there is one camera 132', 132' on each side of the aircraft 105; however, the field of view 134 of each camera 132', 132" includes not only a view a forward flight environment 302 but also a substantially fixed portion of the aircraft 105 including the calibration dots 300.

Another example arrangement of the cameras 132 is shown in FIGS. 4-5. Here, there can be two cameras on each side of the aircraft 105. As an example, there can be a first camera 132a and a second camera 132b operatively connected to the first wing 113 as well as on the second wing 114. The first camera 132a and the second camera 132b can be adjacent to each other. In some arrangements, there can be a slight spacing between the first camera 132a and the second camera 132b. The first camera 132a can have a first field of view 134a, and the second camera 132b can have a second field of view 134b. The first field of view 134a and the second field of view 134b can be adjacent to each other, can slightly overlap each other, or can be slightly space from each other. The first field of view 134a and the second field of view 134b can define the collective field of view 134c.

By using two cameras 132a, 132b on each side of the aircraft 105, the detection and calibration functions can be separated. Thus, the first camera 132a on each side of the aircraft 105 can be dedicated to capturing visual data of a portion of the aircraft 105 that includes the calibration target(s), and the second camera 132b on each side of the aircraft 105 can be dedicated to acquiring visual data of the flight environment (e.g., the forward flight environment in this example). Due to the proximity of the first camera 132a and the second camera 132b, the visual data acquired by the first camera 132a can be used to determine movement of the portion of the aircraft to which the first and second cameras 132a, 132b are mounted (e.g., the wing(s)), which can, in turn, be used to calibrate the second camera 132b or to adjust the visual data acquired by the second camera 132b. Thus, the first camera 132a can be used to calibrate the second camera 132b. The first camera 132a does not need to be calibrated and/or the visual data acquired by the first camera 132a does not need to be adjusted.

It will be appreciated that the arrangements shown in FIGS. 2-5 are merely two examples and that there are various camera arrangements. Indeed, the arrangements in FIGS. 2-5 can be combined. For instance, there can be a single camera 132 (e.g., FIGS. 2-3) on one side of the aircraft 105, and there can be two cameras 132a, 132b (e.g., FIGS. 4-5) on the other side of the aircraft 105.

Further, it will be appreciated that arrangements described herein are not limited to the cameras 132 being mounted on the wings of the aircraft, nor are they limited to detecting the forward flight environment. Indeed, the cameras 132 shown in FIGS. 2-5 can be oriented to capture visual data of the rearward flight environment. In some arrangements, there can be some cameras 132 used to detect the forward flight environment and some cameras 132 used to detect the rearward environment.

Further, arrangements described herein can be used to detect objects to the lateral sides (e.g., left and/or right) of the aircraft 105. Such detection can be accomplished by installing sideways-facing cameras. As an example, one camera 132 can be operatively connected to the nose 107 of the aircraft 105, and another camera 132 can be operatively connected to the tail 108 of the aircraft 105. In such locations, the cameras 132 can be in a relatively stable spot. As such, the cameras 132 may not need to be calibrated as described herein.

When the cameras 132 are forward-facing, they can be configured, positioned, and/or oriented to capture visual data of the calibration target(s) on the fuselage 106 or the nose 107 of the aircraft 105. When the cameras 132 are rearward facing, they can be configured, positioned, and/or oriented to capture visual data of the calibration target(s) on the tail 108 of the aircraft 105. Further, increasing the number of cameras 132 facing in one direction may decrease the overall probability of error.

The system 100 can include one or more input interfaces 140. An "input interface" includes any device, component, system, element or arrangement or groups thereof that enable information/data to be entered into a machine. The input interface(s) 140 can receive an input from a vehicle occupant (e.g., a driver or a passenger). Any suitable input interface(s) 140 can be used, including, for example, a keypad, display, touch screen, multi-touch screen, button, joystick, mouse, trackball, microphone and/or combinations thereof.

The system 100 can include one or more output interfaces 150. An "output interface" includes any device, component, system, element or arrangement or groups thereof that enable information/data to be presented to a vehicle occupant (e.g., a pilot, a passenger, etc.). The output interface(s) 150 can present information/data to the vehicle occupant. The output interface(s) 150 can include a display. Alternatively or in addition, the output interface(s) 150 may include an earphone and/or speaker. Some components of the system 100 may serve as both a component of the input interface(s) 140 and a component of the output interface(s) 150.

The system 100 can include one or more modules, at least some of which will be described herein. The modules can be implemented as computer readable program code that, when executed by a processor, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively or in addition, one or more data store 120 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The system 100 can include one or more camera calibration modules 160. The camera calibration module(s) 160 can be configured to calibrate the camera(s) 132. The camera calibration module(s) 160 can be configured to do so in real-time and in-flight. The camera calibration module(s) 160 can be configured to account for and/or minimize the effect of motion and/or vibration of the camera(s) 132 during flight on visual data acquired by the camera(s) 132. Visual data from a plurality of cameras 132 cannot be accurately compared if the cameras are moving. Hence, the need for calibration to attain a "baseline" where the visual data from the cameras can be compared.

The camera calibration module(s) 160 can be configured to do so by analyzing visual data acquired by the camera(s) 132. More particularly, the camera calibration module(s) 160 can identify the calibration target(s) in the acquired visual data using a machine vision system using any suitable technique, now known or later developed. The camera calibration module(s) 160 can analyze the calibration target(s) in the visual data. Such analyzing can include comparing the position of the calibration target(s) in the visual data to a known reference position of the calibration target(s), which can be stored in the calibration data 122. By comparing the two, the camera calibration module(s) 160 can be configured to determine that manner in which the wing has moved relative to the calibration target(s) at the moment the visual data was captured. The camera calibration module(s) 160 can use suitable calibration method, including, for example, any form of digital image correlation, now known or later developed.

If there is no offset between the acquired visual data and the reference position of the calibration target(s), then no adjustment to the acquired visual data is required. However, if there is an offset between the acquired visual data and the reference position of the calibration target(s) in one or more directions, the camera calibration module(s) 160 can be configured to adjust the acquired visual data to compensate for this offset.

The camera calibration module(s) 160 can detect any offset for the cameras 132 on each side of the aircraft 105 based on visual data acquired at substantially the same time. Once the visual data acquired at substantially the same time by the cameras 132 has been adjusted by the camera calibration module(s) 160, the visual data acquired by the cameras 132 can be synchronized. It will be appreciated that, the greater the number of calibration target(s), the more precise the calibration of the visual data acquired by the cameras 132.

The system 100 can include one or more object detection modules 170. The object detection module(s) 170 can be configured to detect the presence of one or more objects in the external environment of the aircraft 105. The object detection module(s) 170 can be configured to detect the position or location of each detected object relative to the aircraft 105, the distance between each detected object and the aircraft 105 in one or more directions. The object detection module(s) 170 can be configured to do so by using visual data (including adjusted visual data) from the cameras 132 in a stereoscopic manner. The object detection module(s) 170 can use any form of stereoscopy, now known or later developed.

The object detection module(s) 170 can be configured to detect an object in the flight environment by analyzing visual data and/or adjusted visual data acquired by the cameras 132. The object detection module(s) 170 can be configured to detect an object in the visual data using a machine vision system using any suitable technique, now known or later developed. With the visual data acquired by the cameras 132 calibrated by the camera calibration module(s) 160, the visual data can be correlated for stereopsis. Any pixels that appear different between the cameras 132 (e.g., the left and right cameras) are likely to be within the detection range.

Distance estimation without object classification training can substantially reduce the time and cost to develop a detect-and-avoid system while improving reliability. Nighttime obstacles in aviation are identified by point sources of light, such as red beacons or white flashing strobes. However, a stereoscopic system does not need to classify the point source and can therefore determine distance of strobes at night. Integrating the cameras at the farthest extents of the aircraft 105 can increases the detection range of the system from just a few meters to hundreds of meters. A practical detection range in US airspace is 1 statute mile. Separation greater than 4 ft may enable this detection range, depending on the camera sensor size and resolution, and the lens.

The object detection module(s) 170 can operate under the same principle of human binocular depth perception (stereopsis). The main factor limiting depth perception is the distance between the two sensors. System performance is maximized by installing each camera at some lateral separation along the span of an aircraft wing 113, 114 or longitudinal separation along the nose 107 and tail 108 of the aircraft 105.

Figure 6:
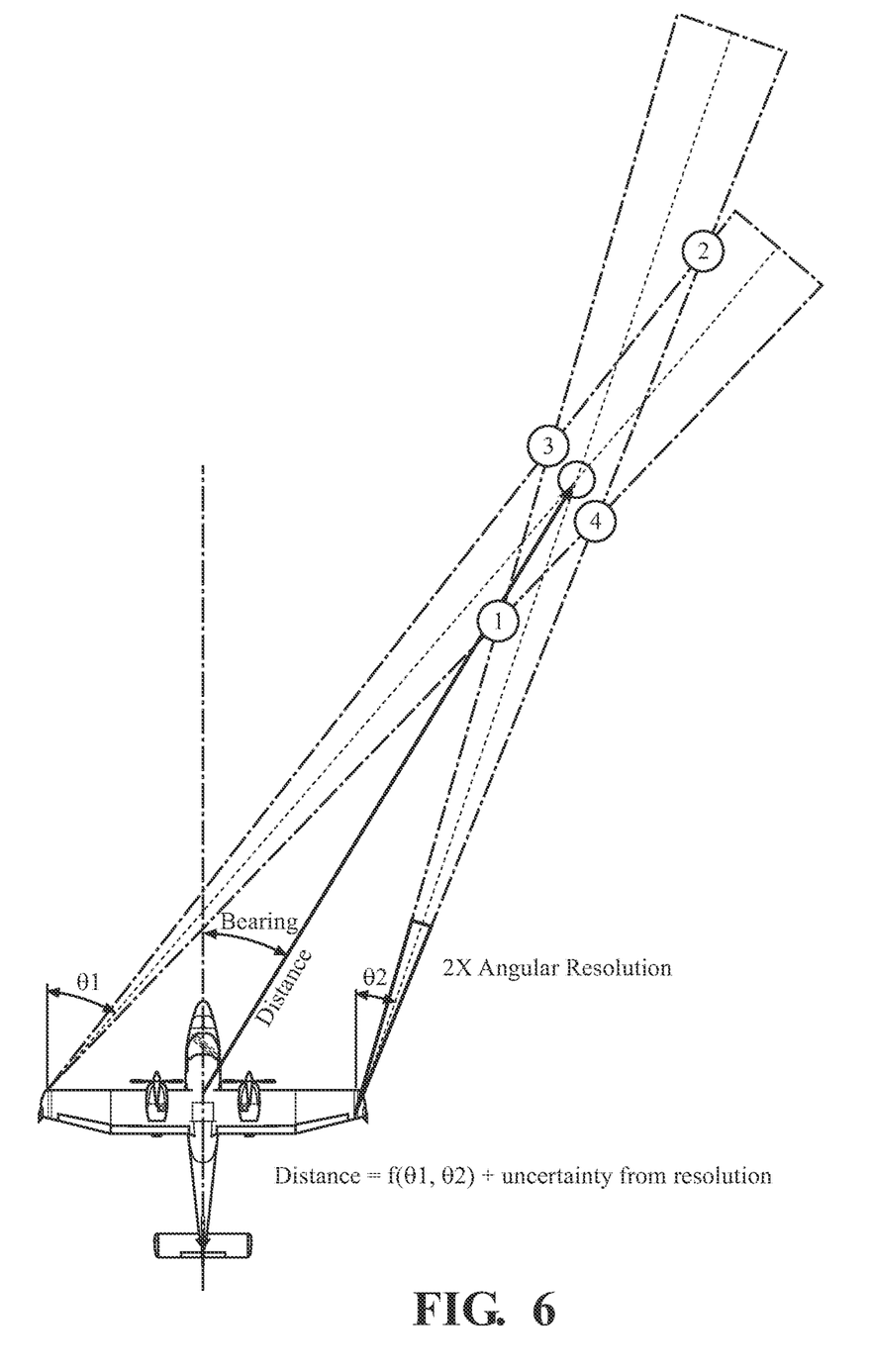
FIG. 6 is an example of object detection using a stereoscopic camera configuration.

The principle of stereoscopic sensing is shown in FIG. 6 (not to scale). The object detection module(s) 170 can be configured to calculate object position based on the relative angle in each camera 132. The angle of the object is known based on which pixels of the sensor it shows up in. Uncertainty of the exact obstacle position can arise because of limitations in the camera 132, especially its angular resolution as the object gets farther and/or smaller. The approximate object position is bounded by points 1-4 below. Using mathematics (e.g., trigonometry), the object detection nodule(s) 170 can determine the position and/or the distance.

Other examples of stereoscopic sensing are described in U.S. Patent Publ. No. 20210392317 and "Sense and Avoid for Small Unmanned Aircraft Systems" to Dolph et al., which are incorporated herein by reference in their entirety.

When an object is detected in the flight environment, the object detection module(s) 170 can, in some arrangements, be configured to cause an alert, message, warning, and/or notification to be presented to an occupant of the aircraft 105 or to a remote person or entity. The object detection module(s) 170 can be operatively connected to the output interface(s) 150, and/or components thereof to cause the alert, message, warning, and/or notification to be presented. The alert, message, warning, and/or notification can have any suitable form. For instance, the alert, message, warning, and/or notification can be visual, audial, haptic, olfactory, or other in nature, or any combination thereof.

The various elements of the system 100 can be communicatively linked through one or more communication networks 195. As used herein, the term "communicatively linked" can include direct or indirect connections through a communication channel or pathway or another component or system. A "communication network" means one or more components designed to transmit and/or receive information from one source to another. The communication network(s) 195 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network(s) 195 further can be implemented as or include one or more wireless networks, whether short or long range. For example, in terms of short-range wireless networks, the communication network(s) 195 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long-range wireless networks, the communication network(s) 195 can include a mobile, cellular, and or satellite-based wireless network and support voice, video, text, and/or any combination thereof. Examples of long-range wireless networks can include GSM, TDMA, CDMA, WCDMA networks or the like. The communication network(s) 195 can include wired communication links and/or wireless communication links. The communication network(s) 195 can include any combination of the above networks and/or other types of networks. The communication network(s) 195 can include one or more routers, switches, access points, wireless access points, and/or the like. In one or more arrangements, the communication network(s) 195 can include Vehicle-to-Vehicle (V2V), Vehicle-to-Infrastructure (V2I), Vehicle-to-Cloud (V2C), or Vehicle-to-Everything (V2X) technology, which can allow for communications between the aircraft 105 and other aircraft of vehicles.

One or more elements of the system 100 include and/or can execute suitable communication software, which enables two or more of the elements to communicate with each other through the communication network(s) 195 and perform the functions disclosed herein.

Now that the various potential systems, devices, elements and/or components of the system 100 have been described, various methods will now be described. Various possible steps of such methods will now be described. The methods described may be applicable to the arrangements described above, but it is understood that the methods can be carried out with other suitable systems and arrangements. Moreover, the methods may include other steps that are not shown here, and in fact, the methods are not limited to including every step shown. The blocks that are illustrated here as part of the methods are not limited to the particular chronological order. Indeed, some of the blocks may be performed in a different order than what is shown and/or at least some of the blocks shown can occur simultaneously.

Figure 7:
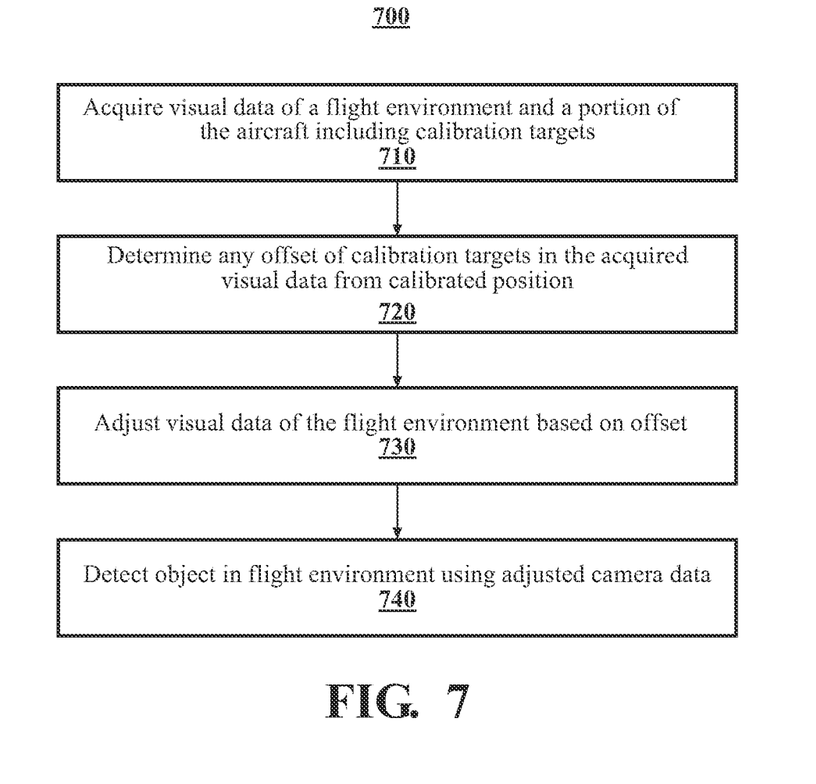
FIG. 7 is an example of a method of calibrating aircraft-mounted cameras and/or object detection using the calibrated aircraft-mounted cameras.

Turning to FIG. 7, an example of a method 700 of calibrating aircraft-mounted cameras and/or object detection using the calibrated aircraft-mounted cameras is shown. At block 710, visual data of the flight environment and a portion of the aircraft including calibration target(s) can be acquired. Such acquiring can be performed by one or more of the sensor(s) 130 and, more particularly, one or more of the camera(s) 132. The acquiring can be done continuously, periodically, irregularly, randomly, or in response to some condition or event. The method 700 can continue to block 720.

At block 720, an offset of the calibration targets from a calibrated or reference position can be determined. Such determining can be performed by the camera calibration module(s) 160 and/or the processor(s) 110. The determining can include the use of the calibration data 122 to compare to the acquired visual data. In some instances, there may not be any offset. The method 700 can continue to block 730.

At block 730, visual data of the flight environment can be adjusted based on offset. Such adjusting can be performed by the camera calibration module(s) 160 and/or the processor(s) 110. The adjusting can include altering the visual data into a different reference frame. In instances in which there is no offset, the visual data may not be adjusted. The method 700 can continue to block 740.

At block 740, an object in flight environment using adjusted visual data. Such detecting can be performed by the object detection module(s) 170 and/or the processor(s) 110.

The method 700 can end. Alternatively, the method 700 can return to block 710 or to some other block. The method 700 can be repeated at any suitable point, such as at a suitable time or upon the occurrence of any suitable event or condition.

Figure 8:
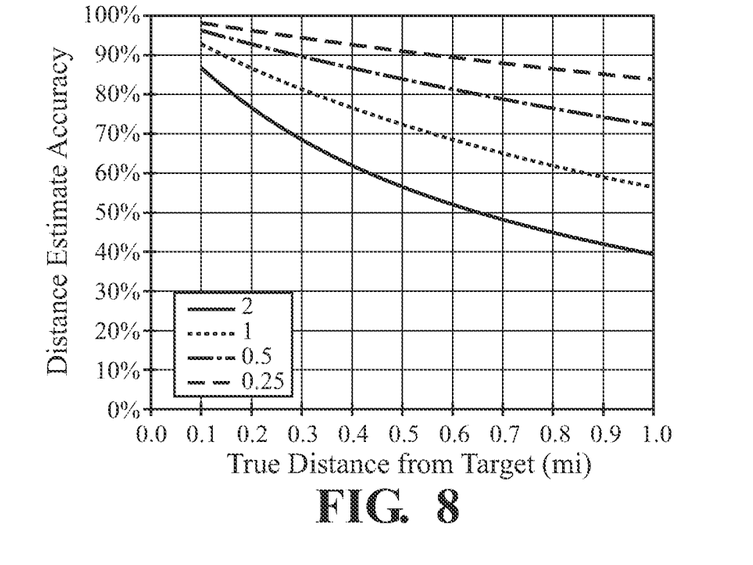
FIG. 8 is a graph of true distance from target versus distance estimate accuracy.
Figure 9:
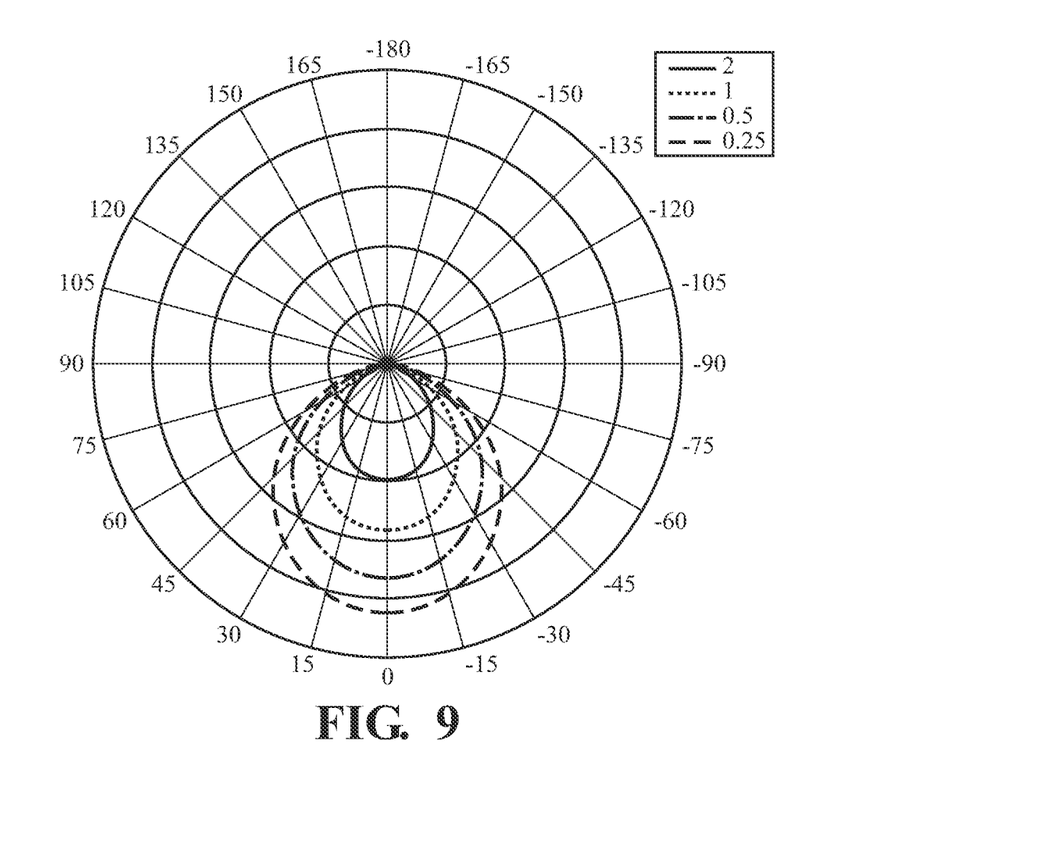
FIG. 9 is a polar graph of stereoscopic performance.

Some estimates of stereoscopic performance of arrangements described herein will now be discussed. These estimates are reflected in FIGS. 8 and 9, and they are generated based on mathematics as opposed to empirical data. FIG. 8 is a graph of true distance from target versus distance estimate accuracy. FIG. 8 shows the distance estimation accuracy decreases the farther away that a target object is from the cameras. FIG. 9 is a polar graph of stereoscopic performance, and it shows how stereoscopic performance degrades as the object moves off to the side of the aircraft. As can be seen, accuracy falls to zero at 90 degrees. This drop in accuracy occurs because, at that point, the sensors have no lateral separation relative to the object position.

It will be appreciated that arrangements described herein can provide numerous benefits, including one or more of the benefits mentioned herein. For example, arrangements described herein can allow for the calibration of wing-mounted cameras in-flight. As a result, arrangements described herein can minimize any reduction in image correlation accuracy or ability between left and right stereo cameras. Arrangements described herein can do so without the need to integrate sensor noise. Further, arrangements described herein can enable distance estimation. Arrangements described herein can avoid the need for object classification training. Arrangements described herein can reduce the time and cost to develop a detect-and-avoid system while improving reliability.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "or" is intended to mean an inclusive "or" rather than an exclusive "or." The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC, or ABC). As used herein, the term "substantially" or "about" includes exactly the term it modifies and slight variations therefrom. Thus, the term "substantially parallel" means exactly parallel and slight variations therefrom. "Slight variations therefrom" can include within 15 degrees/percent/units or less, within 14 degrees/percent/units or less, within 13 degrees/percent/units or less, within 12 degrees/percent/units or less, within 11 degrees/percent/units or less, within 10 degrees/percent/units or less, within 9 degrees/percent/units or less, within 8 degrees/percent/units or less, within 7 degrees/percent/units or less, within 6 degrees/percent/units or less, within 5 degrees/percent/units or less, within 4 degrees/percent/units or less, within 3 degrees/percent/units or less, within 2 degrees/percent/units or less, or within 1 degree/percent/unit or less. In some instances, "substantially" can include being within normal manufacturing tolerances.

Aspects herein can be embodied in other forms without departing from the spirit or essential attributes thereof. Accordingly, reference should be made to the following claims, rather than to the foregoing specification, as indicating the scope hereof.

What is claimed is:

1. An aircraft, comprising:
an aircraft body including a fuselage and a nose;
a wing including a first wing tip and a second wing tip located on opposite sides of the aircraft body;
a camera located on the wing and having a field of view that is less than 180 degrees and includes a portion of a flight environment and a portion of the aircraft body;
a calibration target located in the field of view and being a profile of at least a portion of the fuselage or the nose, whereby the profile is not defined by a separate structure attached to the fuselage or nose,
when appearing in visual data acquired by the camera, the profile being detectable by a computer vision system;
a data store storing a calibrated position of the calibration target relative to the camera; and
a processor operatively connected to the camera and the data store, the processor being configured to analyze the visual data to determine an offset of the camera relative to the calibration target by comparing the calibrated position and an in-flight position of the calibration target relative to the camera in the acquired visual data.

2. The aircraft of claim 1, wherein the camera is part of a stereoscopic camera system.

3. The aircraft of claim 1, wherein the camera is a single camera.

4. The aircraft of claim 1, wherein the camera includes two cameras, one of the two cameras having a field of view corresponding to the flight environment and the other one of the two cameras having a field of view corresponding to the aircraft body including the calibration target.

5. An aircraft, comprising:
an aircraft body;
a wing;
a calibration target located on a substantially fixed portion of the aircraft body;
a first camera and a second camera being operatively connected to the wing and being adjacent to each other, when the aircraft is in flight, the first camera having a first field of view including a portion of the aircraft body including the calibration target, and the second camera having a second field of view corresponding to a flight environment of the aircraft, the second field of view not including the calibration target, the first and second field of views being in the same direction that is one of a forward or rearward direction;
a data store storing a calibrated position of the calibration target relative to the first camera; and
a processor operatively connected to the first and second cameras and the data store, the processor being configured to analyze visual data by the first camera to determine an offset of the first camera relative to the calibration target by comparing the calibrated position and an in-flight position of the calibration target relative to the first camera in the visual data.

6. The aircraft of claim 5, wherein the calibration target is a random speckle pattern.

7. The aircraft of claim 5, wherein the calibration target includes a light.

8. The aircraft of claim 5, wherein the calibration target is configured to be luminescent or retroreflective.

9. The aircraft of claim 1, wherein the camera is oriented to acquire visual data of a portion of a forward flight environment or a rearward flight environment of the aircraft.

10. The aircraft of claim 1, wherein the camera is proximate one of the first wing tip or the second wing tip.

11. The aircraft of claim 1, wherein the processor is further configured to:
adjust, using the determined offset, the visual data acquired by the camera.

12. The aircraft of claim 11, wherein the camera is a first camera, wherein the field of view is a first field of view, and wherein the calibration target is a first calibration target, and further including:
a second camera located on the wing on an opposite side of the aircraft body from the first camera, the second camera having a second field of view, the second field of view including a portion of a flight environment and a portion of the aircraft body, the field of view being less than 180 degrees; and
a second calibration target, the second calibration target being located in the second field of view,
wherein the processor is operatively connected to the second camera, and wherein the processor is further configured to:
receive visual data acquired by the second camera;
analyze the visual data acquired by the second camera to determine an offset of the second camera relative to the second calibration target; and
adjust, using the determined offset, the visual data acquired by the second camera.

13. The aircraft of claim 12, wherein the processor is further configured to:
detect an object in the flight environment using the adjusted visual data from the first camera and the adjusted visual data from the second camera.

14. The aircraft of claim 5, wherein the calibration target is located on a substantially fixed portion of the aircraft body, and wherein the substantially fixed portion of the aircraft body is one of: a nose, a fuselage, or a tail of the aircraft.

15. A method of camera calibration for an aircraft, a first camera and a second camera being operatively connected to a wing of the aircraft, the method comprising:
    acquiring, using the first camera while the aircraft is in flight, visual data of a first portion of a body of the aircraft that includes a calibration target;
    acquiring, using the second camera while the aircraft is in flight, visual data of a second portion of a flight environment of the aircraft and that does not include the calibration target, the acquiring using the first camera and the second camera occurring at substantially the same time, the first and second cameras being adjacent to each other, the first and second portions of the flight environment being in the same direction that is one of a forward or rearward direction;
    analyzing the visual data acquired using the first camera to determine an offset of the first camera relative to the calibration target by comparing a calibrated position stored in a data store and a position of the calibration target relative to the first camera in the acquired visual data, the offset corresponding to a movement of the first camera and the second camera relative to the calibration target due to in flight movement of the wing; and
    adjusting, using the offset of the first camera, the visual data acquired by the second camera.

16. The method of claim 15, wherein the analyzing includes comparing a reference position of the calibration target relative to the first camera and a position of the calibration target relative to the first camera in the acquired visual data.

17. The method of claim 15, further including:
    analyzing the adjusted visual data of the second camera to detect for one or more objects in a flight environment of the aircraft.

18. The aircraft of claim 5, wherein the calibration target is a calibration dot.

19. The aircraft of claim 5, wherein the processor is configured to:
    adjust, using the offset of the first camera, the visual data acquired by the second camera.

20. The aircraft of claim 19, wherein the processor is further configured to:
    detect an object in the flight environment using the adjusted visual data acquired by the second camera.

21. An aircraft, comprising:
    an aircraft body including a nose and a tail;
    a wing;
    a calibration target being a profile of the tail, whereby the profile is not defined by a separate structure attached to the tail;
    a camera operatively connected to the wing and having a field of view including a portion of a rearward flight environment of the aircraft and a portion of the tail including the calibration target,
    when appearing in visual data acquired by the camera, the profile being detectable by a computer vision system;
    a data store storing a calibrated position of the calibration target relative to the camera; and
    a processor operatively connected to the camera and the data store, the processor being configured to analyze visual data acquired by the camera to determine an offset of the camera relative to the calibration target by comparing the calibrated position and an in-flight position of the calibration target relative to the camera in the visual data.

22. The aircraft of claim 21, wherein the processor is configured to:
    adjust, using the offset, the visual data acquired by the camera.

23. The aircraft of claim 22, wherein the processor is further configured to:
    detect an object in the rearward flight environment using the adjusted visual data acquired by the camera.

* * * * *